April 28, 1925.
R. T. NEWTON
AUTOMOBILE BUMPER
Filed Nov. 20, 1920
1,535,847
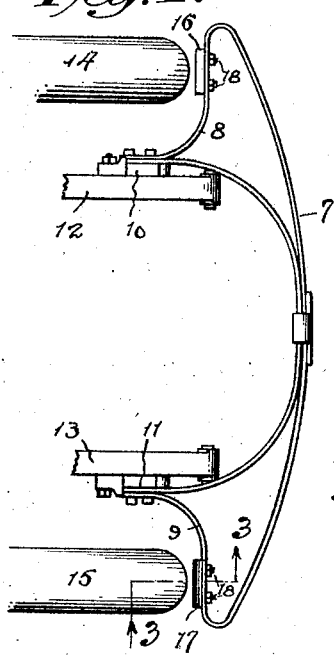
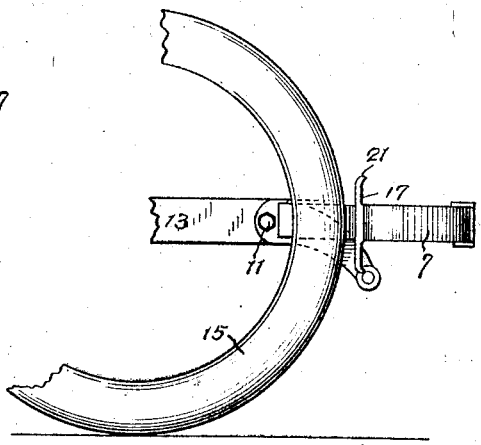
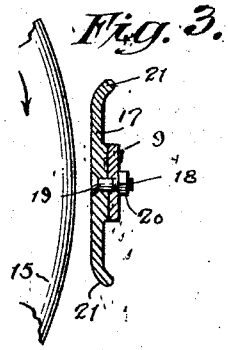
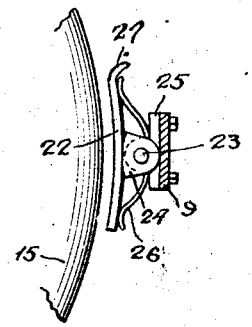
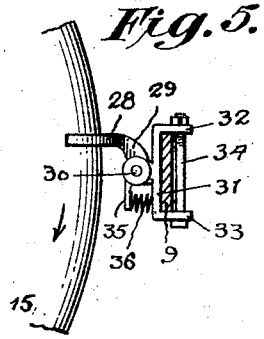
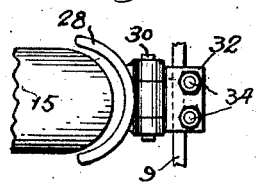
Inventor
RICHARD T. NEWTON
By his Attorneys Patented Apr. 28, 1925.

1,535,847

UNITED STATES PATENT OFFICE.

RICHARD T. NEWTON, OF NEW YORK, N. Y.

AUTOMOBILE BUMPER.

Application filed November 20, 1920. Serial No. 425,342.

*To all whom it may concern:*

Be it known that I, RICHARD T. NEWTON, a citizen of the United States of America, residing in the city of New York, county and State of New York, have invented certain new and useful Improvements in an Automobile Bumper, of which the following is a specification.

My invention relates to automobile bumpers, and the object of my invention is to associate with the bumper a member which not only serves to protect the tires of the car to which the bumper is applied, but also to function as an additional brake element which is brought into action upon impact against the bumper.

In the accompanying drawings—

Fig. 1 is a plan view of a bumper to which my invention is applied in one form;

Fig. 2 is an enlarged side elevation thereof;

Fig. 3 is a section on the line 3—3, Fig. 1;

Fig. 4 is a similar view of a modified construction;

Fig. 5 is a side elevation of a further modification; and

Fig. 6 is a plan thereof.

It is common practice to carry automobile bumpers transversely across the chassis front to an extent sufficient to reach, and in some cases to over-reach the plane of the front wheel of the car. Where the bumper is arranged close to the chassis, there is possibility that on impact against the bumper it may be driven back into engagement with the wheels. Inasmuch as the latter generally carry pneumatic tires, there is a possibility of the tires being severely cut by the pressure of the bumper against the same. I have now provided the bumper with a shoe, which is designed not only to protect the tire under such conditions, but to form a supplementary braking element, which adds its resistance to the ordinary brake and thus serves to more rapidly halt the car.

To illustrate the invention, I have indicated in Fig. 1 a bumper of common type, comprising a transversely extending impact member 7 of spring strap metal, the opposite ends of which are re-curved on a spring bent to form supporting arms 8 and 9 secured in any suitable way at 10 and 11 to the chassis side bars 12 and 13. As will be noted, the over-all length of the bumper exceeds the distance between the wheels 14 and 15, so that upon sufficiently heavy impact against the bumper the supporting arms 8 and 9 may be driven back against the tires of the wheels. To prevent injury to the latter, I have now provided a pair of shoes 16 and 17 carried by the bumper supporting arms 8 and 9 in register with the wheels. While this shoe may be formed integral with the bumper, I have here indicated it as an independent member secured in position by bolts 18, the heads 19 of which are counter-sunk in the face of the shoe and passing through a hole drilled in the bumper supporting arm 8 or 9 are engaged by holding nuts 20. Preferably the upper and lower margins of the shoe are curved, as at 21, to prevent the edge of the shoe from digging into the tire. The shape of the lower end of the shoe in this fashion is not of as much importance as at the upper end, inasmuch as the travel of the wheel during the forward drive of the vehicle is in the direction of the arrow X (Fig. 3).

The shoe may be of various types; thus in Fig. 4 I have shown a shoe 22 pivoted at 23 by means or lugs 24 on a base 25, which is secured to the bumper by bolts 18 in the manner above described. To hold the shoe 22 in proper position, I have indicated a spring strap 26, the arms of which bear against the opposite ends of the shoe and maintain it normally in the position indicated in Fig. 4. In this construction the shoe is also curved to follow the periphery of the tire, and only the upper end of the shoe is shaped at 27 to prevent its edge from digging in the tire when the shoe is pressed against it.

In Figs. 5 and 6, a further modification is indicated in which the shoe 28 is transversely curved to follow the transverse curvature of the tire and partially embraces the latter. To this end the shoe comprises a pair of arms branching from a strap 29 pivoted at 30 to a bracket 31. The latter, in this form, is clamped on the bumper by means of a pair of arms 32 and 33 straddling the bumper and united by the securing bolt 34. The strap 29 has a downward extension 35 below the pivot pin 30, and the coil spring 36 arranged between the bracket 31 and the lug 35 serves to hold the shoe in normal position out of contact with the tire. When the shoe is driven in against the wheel, however, the downward pull occasioned by the frictional engagement of the shoe therewith forces the shoe against the tire with a toggle action sufficiently strong to lock the wheel against rotation.

Various other modifications of construction and arrangement of parts will readily occur to those dealing with the problem. While I have shown the shoe applied to a bumper of the spring strap type, it will be recognized that it may be applied to bumper bars of channel or slide-bar type with like result. Inasmuch as in the practice of mounting the bumpers as close as possible to the chassis and wheels, the importance of providing some protection of this sort to the tires in case of collision will be recognized. Furthermore, the value of the additional braking action secured by the shoe is apparent in view of the desirability of halting the car as rapidly as possible when in collision.

Of course the transverse width of the shoe may be varied to meet different requirements. Furthermore, where a construction such as shown in Fig. 4 or Figs. 5 and 6 is used, it may be desirable to pivot the shoe on a vertical axis to permit it to follow the wheel when the latter lies in a plane at an angle to the chassis side bar—as for instance when the car is being turned.

I claim—

1. A bumper of the character described, comprising an impact member extending transversely of the vehicle, strap metal supporting arms for the ends of said impact member, said supporting arms extending outward beyond the plane of the running wheels of the vehicle, and brake shoes mounted on the said supporting arms in substantial alignment with said wheels and adapted to engage the peripheries thereof on inward deflection of said arms.

2. A bumper of the character described, comprising an impact member extending transversely of the vehicle, strap metal supporting arms for the ends of said impact member, said supporting arms extending outward beyond the plane of the running wheels of the vehicle, and pivoted brake shoes mounted on the said supporting arms in substantial alignment with said wheels and adapted to engage the peripheries thereof on inward deflection of said arms.

3. A bumper element, comprising a brake shoe, having a clamping bracket by means of which it may be mounted on the spring supporting arm of a bumper.

4. A vehicle bumper comprising a transverse impact member extending outboard of the vehicle chassis, and a yielding supporting arm extending across the normal plane of the wheel from the outboard portion of the bumper toward the chassis for support and serving to normally hold the impact member in fixed relation to the chassis regardless of the angular displacement of the wheel, in combination with a brake shoe located on said supporting arm substantially in alignment with a running wheel and adapted to engage the latter on deflection of the bumper by impact.

5. A vehicle bumper comprising a transverse impact member extending outboard of the vehicle chassis, a yielding supporting arm extending from the outboard position of the bumper toward the chassis for support and serving to normally hold the impact member in fixed relation to the chassis regardless of the angular displacement of the wheel, said arm having a reach substantially normal to the vertical plane of the chassis side bar, and extending across the path of the running wheel, in combination with a brake shoe located at said reach of said supporting arm and adapted to engage the running wheel on deflection of the bumper by impact.

In testimony whereof I have signed my name to this specification.

RICHARD T. NEWTON.